United States Patent
Shi

(10) Patent No.: US 12,319,292 B2
(45) Date of Patent: Jun. 3, 2025

(54) INTELLIGENT VEHICLE CONTROL METHOD, APPARATUS, AND CONTROL SYSTEM

(71) Applicant: SHENZHEN YINWANG INTELLIGENT TECHNOLOGIES CO., LTD., Shenzhen (CN)

(72) Inventor: Bin Shi, Shenzhen (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 322 days.

(21) Appl. No.: 17/851,509

(22) Filed: Jun. 28, 2022

(65) Prior Publication Data

US 2022/0324449 A1  Oct. 13, 2022

Related U.S. Application Data

(63) Continuation of application No. PCT/CN2020/125644, filed on Oct. 31, 2020.

(30) Foreign Application Priority Data

Dec. 28, 2019 (CN) .......................... 201911385152.7

(51) Int. Cl.
  *B60W 30/182* (2020.01)
  *B60W 50/00* (2006.01)
  (Continued)

(52) U.S. Cl.
  CPC .......... *B60W 30/182* (2013.01); *B60W 50/10* (2013.01); *B60W 60/005* (2020.02);
  (Continued)

(58) Field of Classification Search
  CPC .. B60W 30/182; B60W 50/10; B60W 50/082; B60W 50/08; B60W 50/085;
  (Continued)

(56) References Cited

U.S. PATENT DOCUMENTS 5,995,883 A    11/1999  Nishikado
2006/0015231 A1*  1/2006  Yoshimura ............ B60L 3/0076
                                                     701/1
(Continued)

FOREIGN PATENT DOCUMENTS

CN    103863330 A    6/2014
CN    104199432 A   12/2014
(Continued)

OTHER PUBLICATIONS

Chen et al, G. Speed Tracking Control for Unmanned Driving Robot Vehicle Based on Fuzzy Adaptive Sliding Mode Control, Google Scholar, IEEE Transactions on Vehicular Technology, vol. 71, No. 12, Dec. 2022, pp. 12617-12625. (Year: 2022).*
(Continued)

*Primary Examiner* — Russell Frejd
(74) *Attorney, Agent, or Firm* — Fish & Richardson P.C.

(57) ABSTRACT

Example intelligent vehicle control methods and apparatus are described. In one example method, an intelligent vehicle control system obtains a driving mode, a driving style model, and a target speed of an intelligent vehicle at a current moment, then determines a speed control instruction based on the driving mode and the driving style model. The intelligent vehicle control system sends the speed control instruction to an execution system of the intelligent vehicle.

20 Claims, 6 Drawing Sheets

(51) Int. Cl.
*B60W 50/10* (2012.01)
*B60W 60/00* (2020.01)

(52) U.S. Cl.
CPC .............. *B60W 2050/002* (2013.01); *B60W 2050/0063* (2013.01); *B60W 2050/0066* (2013.01); *B60W 2520/10* (2013.01); *B60W 2540/106* (2013.01); *B60W 2540/12* (2013.01); *B60W 2540/21* (2020.02); *B60W 2540/30* (2013.01); *B60W 2556/40* (2020.02); *B60W 2720/10* (2013.01)

(58) Field of Classification Search
CPC .... B60W 50/00; B60W 60/005; B60W 60/00; B60W 60/0013; B60W 60/0051; B60W 60/0053; B60W 60/001; B60W 2050/002; B60W 2050/0063; B60W 2050/0066; B60W 2050/0021; B60W 2050/0005; B60W 2050/0011; B60W 2050/0022; B60W 2520/10; B60W 2540/106; B60W 2540/12; B60W 2540/21; B60W 2540/30; B60W 2540/10; B60W 2556/40; B60W 2556/10; B60W 2720/10; B60W 2720/103; B60W 2720/106; B60W 40/09; B60W 40/105; B60W 40/107; B60W 10/18; B60W 2554/4042

See application file for complete search history.

(56) References Cited

U.S. PATENT DOCUMENTS

| | | | | |
|---|---|---|---|---|
| 2017/0329330 | A1* | 11/2017 | Hatano | B60W 60/0051 |
| 2018/0018895 | A1 | 1/2018 | Chan et al. | |
| 2018/0251135 | A1 | 9/2018 | Luo et al. | |
| 2019/0185011 | A1* | 6/2019 | Zheng | B60W 40/09 |
| 2019/0187708 | A1* | 6/2019 | Zheng | B60W 60/0011 |
| 2020/0272835 | A1* | 8/2020 | Cheng | B60W 50/14 |

FOREIGN PATENT DOCUMENTS

| | | |
|---|---|---|
| CN | 104828090 A | 8/2015 |
| CN | 104991580 A | 10/2015 |
| CN | 105022777 A | 11/2015 |
| CN | 105511475 A | 4/2016 |
| CN | 106023344 A | 10/2016 |
| CN | 106407563 A | 2/2017 |
| CN | 109720350 A | 5/2019 |
| CN | 110033618 A | 7/2019 |
| CN | 110053623 A | 7/2019 |
| CN | 110254251 A | 9/2019 |
| CN | 110378483 A | 10/2019 |
| CN | 110471411 A | 11/2019 |
| CN | 110576864 A | 12/2019 |
| DE | 102017206006 A1 | 10/2018 |
| JP | 2012091563 A | 5/2012 |
| JP | 2013122653 A | 6/2013 |
| JP | 2015089801 A | 5/2015 |
| JP | 2015182526 A | 10/2015 |
| RU | 2524846 C2 | 8/2014 |
| RU | 2707146 C1 | 11/2019 |
| WO | 2016109540 A1 | 7/2016 |
| WO | 2018138767 A1 | 8/2018 |
| WO | 2019058460 A1 | 3/2019 |
| WO | 2019058462 A1 | 3/2019 |

OTHER PUBLICATIONS

Deng et al, Z. A Probabilistic Model for Driving-Style-Recognition-Enabled Driver Steering Behaviors, Google Scholar, IEEE Transactions on Systems, Man, and Cybernetics: Systems, vol. 52, No. 3, Mar. 2022, pp. 1838-1851. (Year: 2022).*

Extended European Search Report in European Appln No. 20905108.5, dated Jun. 27, 2023, 8 pages.

Li et al., "Personalized Driver Model and Its Application to Vehicle Testing," Journal of Mechanical Engineering, vol. 51, No. 18, Sep. 2015, 12 pages (with English abstract and partial English machine translation).

Office Action in Chinese Appln. No. 201911385152.7, dated Mar. 10, 2022, 20 pages (with English translation).

Office Action in Chinese Appln. No. 201911385152.7, dated Oct. 10, 2022, 18 pages (with English translation).

Search Report in Chinese Appln. No. 201911385152.7, mailed on Mar. 1, 2022, 5 pages (with English translation).

International Search Report and Written Opinion in International Appln. No. PCT/CN2020/125644, mailed on Jan. 29, 2021, 17 pages (with English translation).

Office Action in Japanese Appln. No. 2022-539450, mailed on Aug. 8, 2023, 4 pages (with English translation).

Office Action in Korean Appln. No. 10-2022-7026201, mailed on Oct. 14, 2024, 10 pages (with English translation).

Office Action in Russian Appln. No. 2024121809/07(048421), mailed on Jan. 9, 2025, 27 pages (with English Translation).

Office Action in Japanese Appln. No. 2022-539450, mailed on Jan. 14, 2025, 7 pages (with English Translation).

* cited by examiner

INTELLIGENT VEHICLE CONTROL METHOD, APPARATUS, AND CONTROL SYSTEM

CROSS-REFERENCE TO RELATED APPLICATIONS

This application is a continuation of International Application No. PCT/CN2020/125644, filed on Oct. 31, 2020, which claims priority to Chinese Patent Application No. 201911385152.7, filed on Dec. 28, 2019. The disclosures of the aforementioned applications are hereby incorporated by reference in their entireties.

TECHNICAL FIELD

This application relates to the field of intelligent vehicle, and in particular, to an intelligent vehicle control method, apparatus, and system.

BACKGROUND

With development of an artificial intelligence (AI) technology and application of the technology in an automobile field, an intelligent vehicle (intelligent vehicle) having an automated driving (automated driving) function is widely concerned. A control module in an intelligent vehicle is used to control traveling of the intelligent vehicle. The control module needs to determine a traveling track and a speed. The traveling track depends on a destination that is set by a driver, and the speed is usually determined by using a conventional error feedback method. To make the intelligent vehicle reach an expected speed, the control module adjusts an error by using a proportional-integral-derivative (proportional-integral-derivative, PID) method, and determines a current accelerator control amount and a current brake control amount according to a control algorithm and accelerator and brake values at a previous moment. However, because road conditions of traveling road sections of the intelligent vehicle are complex and diverse, the intelligent vehicle needs to consider a traveling condition of another vehicle and a road infrastructure condition to avoid an obstacle, so that the intelligent vehicle always travels at a changing speed. For the control module, a larger error between a current speed and a target speed indicates a larger adjustment range. During automated driving of the intelligent vehicle, the control module frequently switches between an accelerator and a brake. In the foregoing error feedback method, comfort of a person in the vehicle is not considered, and experience is relatively poor. Therefore, how to provide an intelligent vehicle control method with high comfort and good experience becomes an urgent technical problem to be resolved.

SUMMARY

This application provides an intelligent vehicle control method, to improve comfort and driving experience of an intelligent vehicle.

According to a first aspect, an intelligent vehicle control method is provided. A vehicle control system first obtains a driving mode, a driving style model, and a target speed of an intelligent vehicle at a current moment, then determines a speed control instruction based on the driving style model and the driving mode, and sends the speed control instruction to a vehicle execution system of the intelligent vehicle. According to the foregoing method, traveling of the intelligent vehicle may be controlled with reference to a driving style model selected by a driver. This improves driving experience of the driver and comfort of driving the intelligent vehicle by the driver.

In a possible implementation, the speed control instruction includes an accelerator opening degree and a brake value. The accelerator opening degree and the brake value are key factors for controlling traveling of the intelligent vehicle. Different drivers have different driving habits when manually driving the intelligent vehicle. For example, drivers differently control an accelerator pedal and a brake pedal in a fossil fuel-powered vehicle, or drivers differently control a vehicle acceleration and a braking system in an electric vehicle. The accelerator opening degree is a parameter used to control a vehicle acceleration in the intelligent vehicle, and the brake value is a parameter used to control vehicle braking in the intelligent vehicle. According to the foregoing method, the speed control instruction including the accelerator opening degree and the brake value is determined by using the driving style model selected by the driver, so as to control the intelligent vehicle to travel based on the driving style model selected by the driver. This improves comfort of driving the intelligent vehicle by the driver.

In another possible implementation, the vehicle control system includes a decision-making controller and an automated driving controller. The decision-making controller may determine a traveling track and the target speed based on road condition information at the current moment. The road condition information includes one or more pieces of information provided by a map system, a positioning device, and a fusion system of the intelligent vehicle. The automated driving controller obtains the driving mode and the driving style model that are selected by the driver, and further determines the speed control instruction based on the driving style model, the driving mode, and the road condition information.

In another possible implementation, the driving mode of the intelligent vehicle includes a manual driving mode and an automated driving mode. In the automated driving mode, the driver can select a driving style model through the intelligent vehicle. The intelligent vehicle includes a driving style model library, the driving style model library includes a set of a plurality of preset driving style models, and each driving style model includes a different accelerator opening degree and a different brake value. Accelerator opening degrees and brake values are used to indicate driving habits of different drivers. In a traveling process of the intelligent vehicle, controlling the intelligent vehicle to travel based on an accelerator opening degree and a brake value in a different driving style model simulates controlling the intelligent vehicle to travel with a driving style selected by the driver based on a preference of the driver. This implements a driving operation that better matches a driving habit of the driver.

In another possible implementation, when the driving mode of the intelligent vehicle is the manual driving mode, the vehicle control system may collect driving data of the driver of the intelligent vehicle within a preset time period; obtain, based on the driving data by using a machine learning algorithm, a customized driving style model that matches the driving habit of the driver, where the customized driving style model includes an accelerator opening degree and a brake value that match the driving habit of the driver; and then add the customized driving style model to the driving style model library stored in the intelligent vehicle. In this application, in addition to using a driving style model library that is preset in the intelligent vehicle, it is allowed to collect driving data of the driver in the manual driving mode, and obtain a driving style model that matches a current driving habit of the driver through training based on the driving data. If the intelligent vehicle switches to the automated driving mode, the driver may select a customized driving style model, and the intelligent vehicle simulates the current driving habit of the driver based on an accelerator opening degree and a brake value in the model to control the intelligent vehicle to travel. This improves driving experience of the driver.

In another possible implementation, the automated driving controller calculates an error between an actual speed and the target speed of the intelligent vehicle at the current moment; determines an acceleration based on the error, where the acceleration is used to indicate a speed change amount of the intelligent vehicle from the actual speed at the current moment to the target speed within a unit time; determines a first accelerator opening degree and a first brake value according to a proportional-integral-derivative algorithm; determines a second accelerator opening degree and a second brake value based on the driving style model selected by the driver; and obtains a third accelerator opening degree through calculation based on the first accelerator opening degree, a first weight, the second accelerator opening degree, and a second weight, and obtains a third brake value through calculation based on the first brake value, a third weight, the second brake value, and a fourth weight. The first weight and the second weight are accelerator opening degree weights, a sum of the first weight and the second weight is 1, the third weight and the fourth weight are brake value weights, and a sum of the third weight and the fourth weight is 1. The speed control instruction including the third accelerator opening degree and the third brake value are sent to the vehicle execution system.

In another possible implementation, the driving style model library of the intelligent vehicle is provided for the driver through a human-computer interaction controller. The driver can select a driving style model from the driving style model library in a form of human-computer interaction such as a voice, a text, or a button. The driving style model that is selected by the driver and that is sent by the human-computer interaction controller is received. The driver may exchange a message with the intelligent vehicle in a form of a voice, a text, or the like through the human-computer interaction controller, to learn of a traveling status of the intelligent vehicle and further control a traveling process of the intelligent vehicle, instead of experiencing an automated driving process in a case of being completely ignorant of the traveling process of the intelligent vehicle. This improves driving experience of the driver. In addition, in an emergency, the driver may also control the intelligent vehicle to travel in a form of an interaction interface provided by the human-computer interaction controller, a voice, or the like, instead of completely relying on a controller of the intelligent vehicle. This further improves safety of the traveling process of the intelligent vehicle.

According to a second aspect, this application provides an intelligent vehicle control apparatus. The control apparatus includes modules configured to perform the intelligent vehicle control method according to any one of the first aspect and the possible implementations of the first aspect.

According to a third aspect, this application provides an intelligent vehicle control system. The intelligent vehicle control system includes a decision-making controller and an automated driving controller. The decision-making controller and the automated driving controller are configured to perform the operation steps of the method performed by each execution body according to any one of the first aspect and the possible implementations of the first aspect.

According to a fourth aspect, this application provides an intelligent vehicle control system. The control system includes a processor, a memory, a communications interface, and a bus. The processor, the memory, and the communications interface are connected to and communicate with each other through the bus. The memory is configured to store computer-executable instructions. When the control system runs, the processor executes the computer-executable instructions in the memory to perform, by using hardware resources in the control system, the operation steps of the method according to any one of the first aspect and the possible implementations of the first aspect.

According to a fifth aspect, this application provides an intelligent vehicle. The intelligent vehicle includes a control system, wherein the control system is configured to perform functions implemented by the control system according to any one of the fourth aspect and the possible implementations of the fourth aspect.

According to a sixth aspect, this application provides a computer-readable storage medium. The computer-readable storage medium stores instructions. When the instructions are run on a computer, the computer is enabled to perform the method in the foregoing aspect.

According to a seventh aspect, this application provides a computer program product including instructions. When the computer program product runs on a computer, the computer is enabled to perform the method according to the foregoing aspect.

Based on the implementations provided in the foregoing aspects, this application may provide more implementations through further combination.

DESCRIPTION OF EMBODIMENTS

The following clearly describes the technical solutions in this application with reference to the accompanying drawings in the embodiments of this application.

Figure 1:
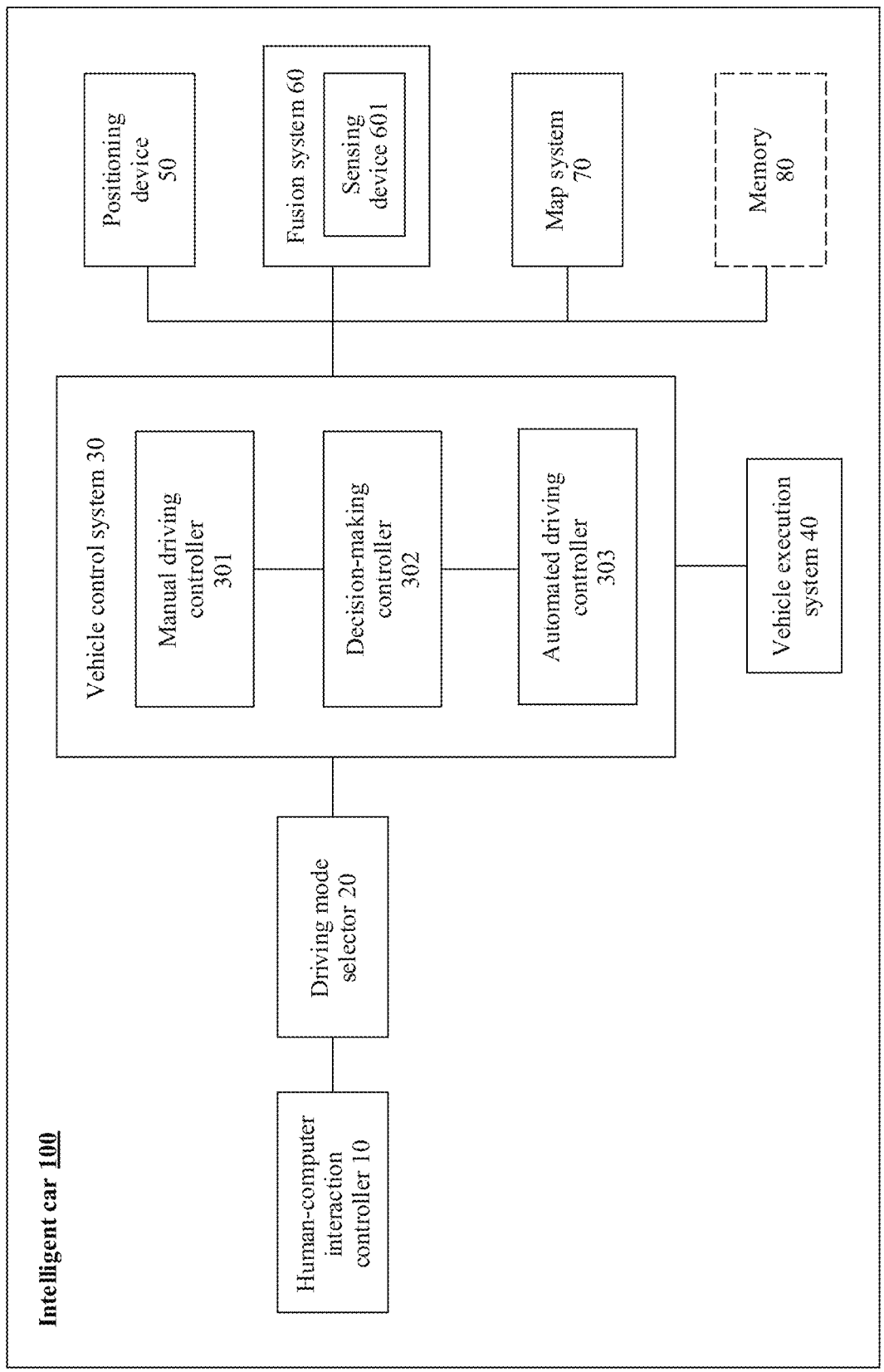
FIG. 1 is a schematic diagram of a logical architecture of an intelligent vehicle according to this application.

First, FIG. 1 is a schematic diagram of a logical architecture of an intelligent vehicle 100 according to this application. As shown in the figure, the intelligent vehicle 100 includes a human-computer interaction controller 10, a driving mode selector 20, a vehicle control system 30, a vehicle execution system 40, a positioning device 50, a sensing system 60, and a map system 70.

The human-computer interaction controller 10 is configured to implement message exchange between the intelligent vehicle and a driver. The driver may select a driving mode and a driving style model of the intelligent vehicle through the human-computer interaction controller 10. The human-computer interaction controller 10 may exchange a message with the driver in a form of a voice, a text, or the like, or may exchange a message with the driver in another form, for example, through seat vibration or in-vehicle indicator flashing.

The driving mode selector 20 is configured to transfer, to the vehicle control system 30, information entered by the driver by using the human-computer interaction controller 10, and then the vehicle control system 30 controls the intelligent vehicle to travel based on the driving style model selected by the driver. In this case, the vehicle control system 30 controls the intelligent vehicle through the vehicle execution system 40. The vehicle execution system 40 includes but is not limited to a device or a subsystem that controls vehicle body traveling, such as a braking system, a steering system, a driving system, or a lighting system.

The vehicle control system 30 further includes a manual driving controller 301, a decision-making controller 302, and an automated driving controller 303. The manual driving controller 301 is configured to: obtain and store user driving data; and train the collected data by using a neural network model, to obtain a driving style model of the training data. The manual driving controller 301 may store the obtained user driving data in a memory of the manual driving controller, or may store the user data in another storage device of the intelligent vehicle. The decision-making controller 302 is a subsystem configured to provide the intelligent vehicle with decision making and path planning including but not limited to global path planning, behavior planning, and operation planning. The automated driving controller 303 is configured to control the intelligent vehicle to travel based on a traveling track and a speed of the intelligent vehicle that are planned by the decision-making controller 302 and the driving style model selected by the driver.

In a possible implementation, the vehicle control system 30 may include one processor or one group of processors. Functions of the manual driving controller 301, the decision-making controller 302, and the automated driving controller 303 are implemented by one or more processors, or functions of the manual driving controller 301, the decision-making controller 302, and the automated driving controller 303 are implemented by one group of processors. Optionally, in addition to hardware, the functions of the manual driving controller 301, the decision-making controller 302, and the automated driving controller 303 may be implemented by using software or by using a combination of software and hardware.

The positioning device 50 includes a device or a subsystem configured to determine a vehicle position, such as a global positioning system (global positioning system, GPS) or an inertial navigation system (inertial navigation system, INS).

The fusion system 60 is configured to provide the sensing device 601 of the intelligent vehicle with fusion, association, and prediction functions to obtain a target object, so as to provide each subsystem of the intelligent vehicle with correct static and/or dynamic obstacle information including but not limited to a position, a size, a posture, and a speed of a physical object such as a person, a vehicle, or a roadblock. The sensing device 601 is configured to provide the intelligent vehicle with target detection and classification, and includes one or more of sensing devices such as radar, a sensor, and a camera.

Optionally, the intelligent vehicle 100 may further include a memory 80, configured to store a map file. The vehicle controller 30 may obtain the map file from the memory 80, and control the traveling track of the intelligent vehicle with reference to real-time road condition information.

It should be noted that the intelligent vehicle in this application includes a vehicle that supports an intelligent driving function, and may be a fossil fuel-powered vehicle, an electric vehicle, or another new-type energy vehicle. The logical architecture of the intelligent vehicle shown in FIG. 1 is merely an example of the intelligent vehicle provided in this application, and the structure of the intelligent vehicle does not constitute a limitation on the technical solution to be protected in this application. In addition, the devices or systems shown in FIG. 1 may be implemented by using software or hardware. This is not limited in this application.

Figure 2A:
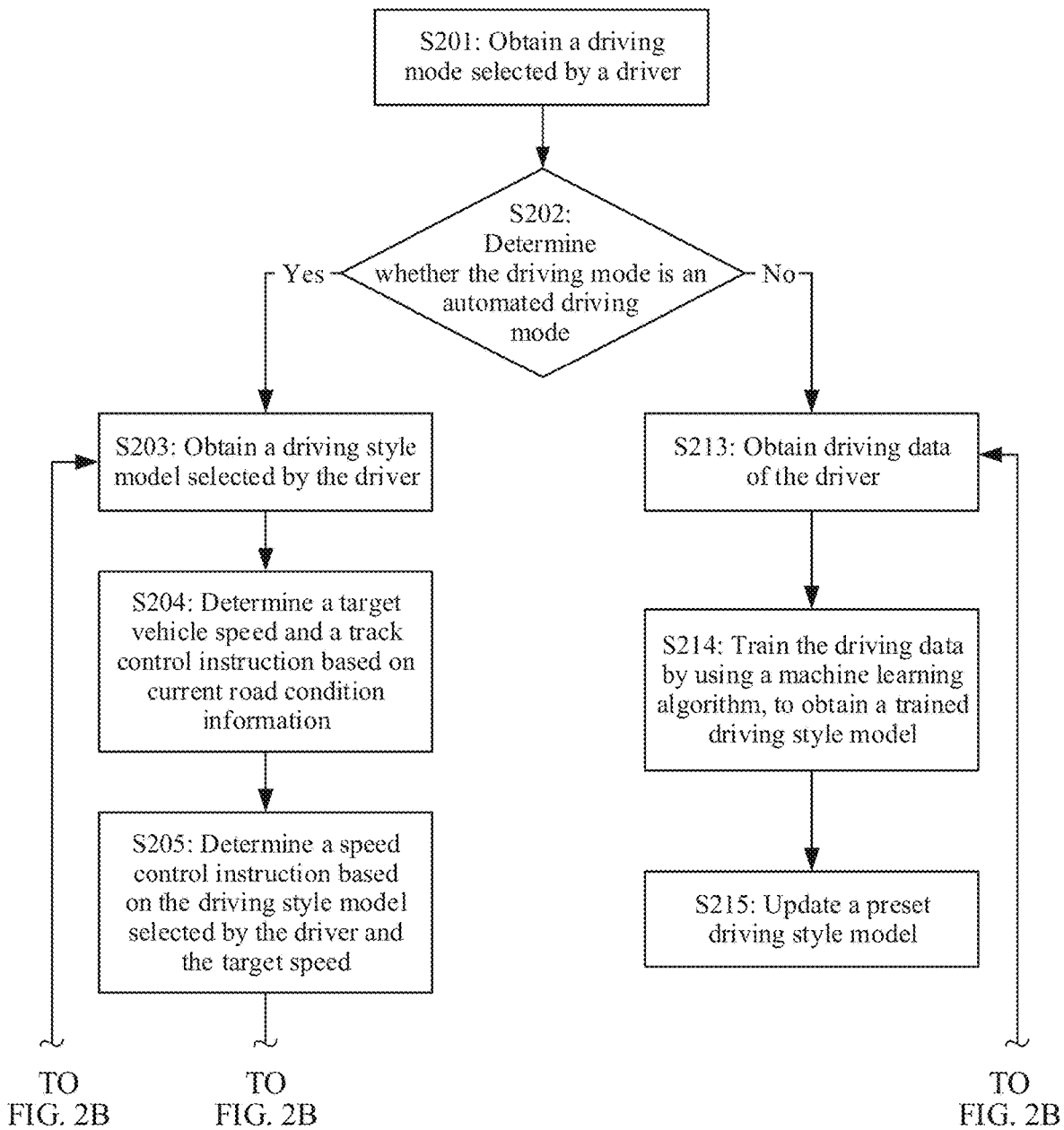
FIG. 2A and FIG. 2B are a schematic flowchart of an intelligent vehicle control method according to this application.
Figure 2B:
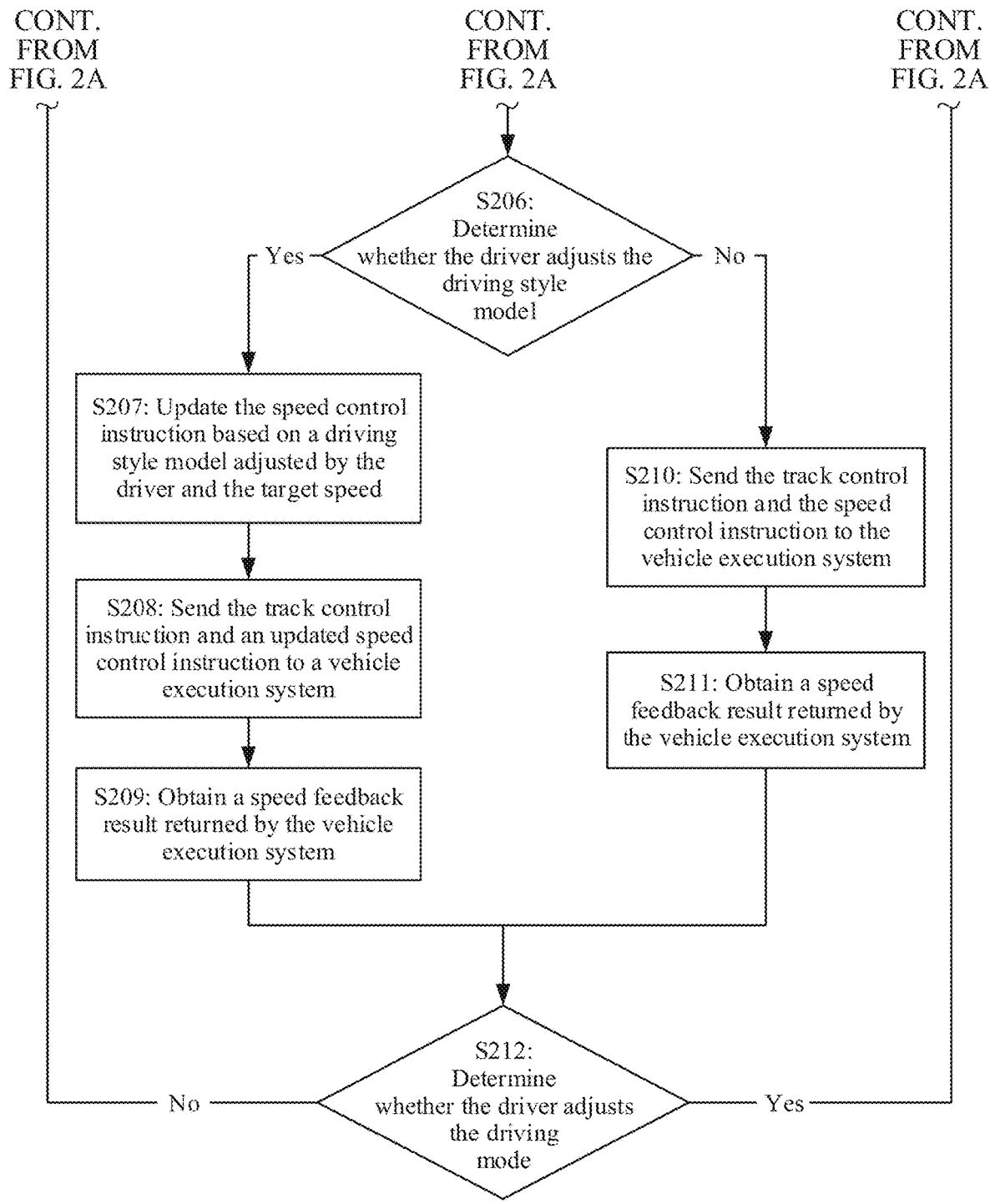

The following further describes an intelligent vehicle control method provided in this application with reference to FIG. 2A and FIG. 2B. As shown in the figure, the method includes the following steps.

S201: Obtain a driving mode selected by a driver.

Figure 3:
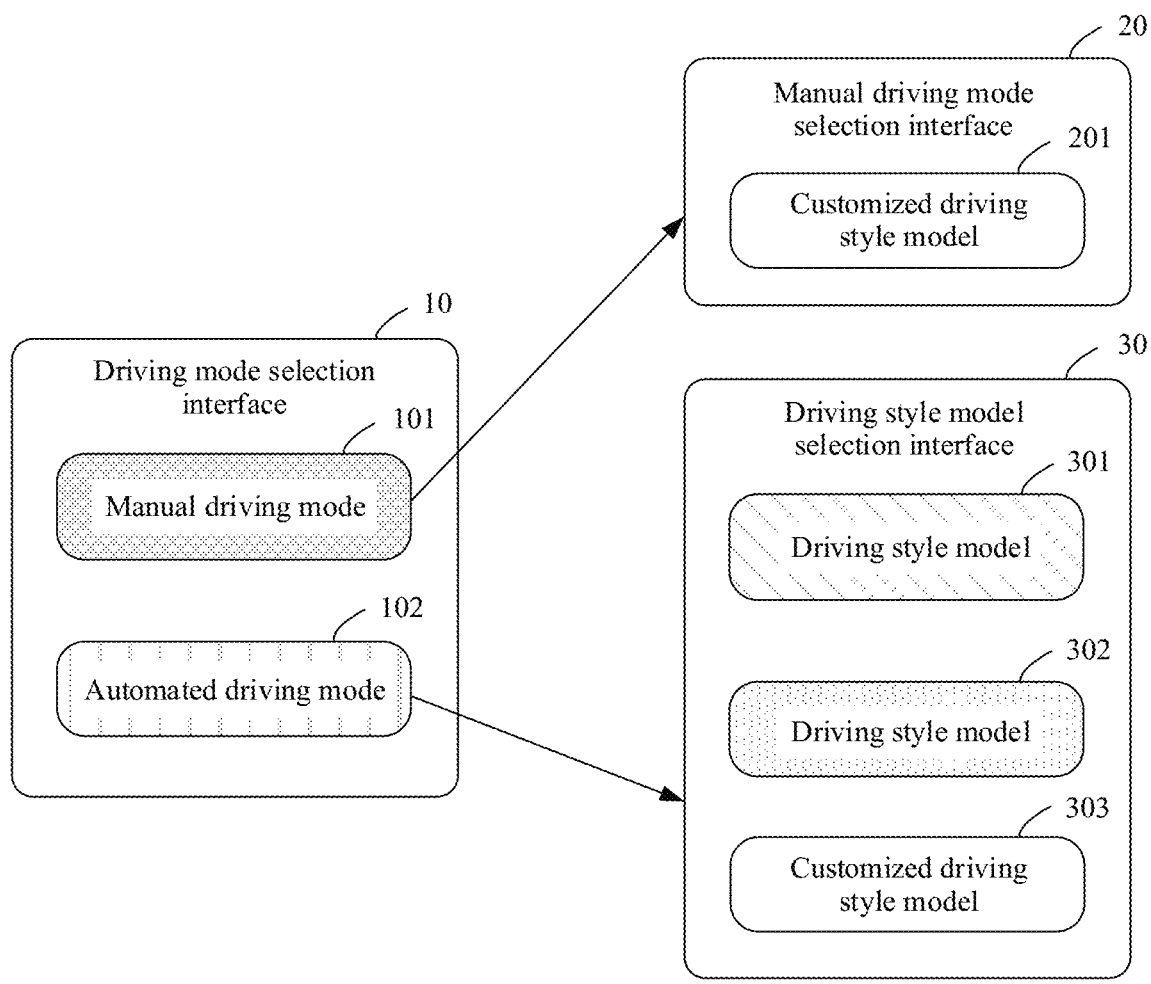
FIG. 3 is a schematic flowchart of a method for controlling an intelligent vehicle in an automated driving mode according to this application.

An intelligent vehicle may receive an instruction of the driver through the human-computer interaction controller 10 shown in FIG. 1. For example, FIG. 3 is a schematic diagram of a human-computer interaction interface. As shown in the figure, the driver may select a manual driving mode 101 or an automated driving mode 102 through a driving mode selection interface 10. The interface may indicate different modes by using identifiers, such as colors and/or patterns, that can identify different modes.

Optionally, in addition to the foregoing interface button prompt, the human-computer interaction controller may also provide a voice prompt, and allow the driver to enter an instruction by using a voice, so that a user conveniently selects a driving mode. During voice selection, the driver is allowed to first select a driving mode in a form of a voice according to an actual requirement.

When the driver selects the automated driving mode, a human-computer interaction system may further prompt, in a form of a voice or an interface, a driving style that the driver needs to select. Further, the human-computer interaction system may provide a brief explanation of each driving style. The human-computer interaction system may notify the driver of a feature of each driving style model in a form of an interface or a voice, so that the driver better selects a driving style required by the driver. For example, FIG. 3 provides a schematic diagram of a driving style model selection interface 30. As shown in the figure, the intelligent vehicle includes three driving style models: a driving style model 301, a driving style model 302, and a customized driving style model 303. In addition, the human-computer interaction controller may present information about interaction between the intelligent vehicle and the driver in the intelligent vehicle through a visualized interface. For example, the human-computer interaction interface may be displayed on a windshield, or may be displayed on a rearview mirror or another vehicle-mounted device or interface. This facilitates interaction between the driver and the intelligent vehicle system. After the intelligent vehicle receives the instruction of the driver, the driving mode selector 20 obtains the driving mode selected by the driver, and further plans a traveling track and a speed of the intelligent vehicle.

S202: Determine whether the driving mode is the automated driving mode.

A vehicle control system needs to determine whether the driving mode selected by the driver is the automated driving mode; and if the driving mode is the automated driving mode, performs step S203; or if the driving mode is the manual driving mode, performs step S213.

S203: When the driving mode is the automated driving mode, obtain a driving style model selected by the driver.

When the driving mode is automated driving, the driver may further select a driving style through the human-computer interaction interface. Each driving style corresponds to one driving style model. For example, for the driving style selection prompt 30 shown in FIG. 3, the interface includes the driving style model 301, the driving style model 302, and the customized driving style model 303. After the driver determines a driving style model, a selected result (for example, an identifier of the driving style model) is transferred to a vehicle controller through the human-computer interaction controller and the driving mode selector, and an automated driving controller controls the intelligent vehicle to travel to a destination based on a driving style selected by the driver.

There is at least one driving style model in the intelligent vehicle. A driving style model may be obtained in any one or more of the following manners:

Manner 1: A driving style model is preset in the intelligent vehicle.

A driving style model library is preset in the intelligent vehicle, and the driving style model library includes at least one driving style model. Each driving style model may be preset during manufacture of the intelligent vehicle. Driving data of a plurality of preset types of drivers may be used as original data, and the original data is trained by using a machine learning algorithm, so as to obtain a driving style model that matches a driving habit of each type of driver.

A driving style model may be obtained by training original data by using a neural network model. During implementation, the driving style model may be obtained by training the original data by selecting any neural network model according to a service requirement. For example, driving data is trained by using a neural network model having three layers of neurons. The neural network model mainly includes three layers: an input layer, a hidden layer, and an output layer. The input layer is used to extract some features of the driving data, the hidden layer is used to extract a feature in the driving data other than the features extracted by the input layer, and the output layer is used to process the features extracted by the input layer and the hidden layer to output a final result. Optionally, the hidden layer may further extract what is required based on the features extracted by the input layer, and extract a feature other than the features extracted by the input layer. Optionally, to ensure that the driving style model obtained by the neural network model is closer to real driving data of the driver, a training result may be corrected by using a back propagation (back propagation, BP) principle. To be specific, an output result obtained by the neural network model is compared with the real data, and a weight of a neuron at each layer is further adjusted, so that a result obtained through neural network model training is closer to the real data. A quantity of neurons at each layer in the neural network model may be set according to a specific service requirement.

During driving style model training, a target speed, a current speed, and an acceleration are used as input values of a back propagation neural network model, and an accelerator opening degree and a brake value are output values of the neural network model. The accelerator opening degree is a parameter used to control a vehicle acceleration in the intelligent vehicle, and a larger accelerator opening degree indicates a larger acceleration. For example, in a fossil fuel-powered vehicle, an engine controls a fuel injection volume based on an air throttle opening degree, so as to control a vehicle acceleration. The accelerator opening degree is an air throttle opening degree. During implementation, the accelerator opening degree means that a driver controls an air throttle opening degree through an accelerator pedal. Alternatively, the accelerator opening degree may be understood as an accelerator pedal opening degree, which is similar to an angle formed between an accelerator pedal and a horizontal plane when the driver steps on the accelerator pedal and applies pressure to the accelerator pedal. Alternatively, the accelerator opening degree is simply understood as a depth at which the driver steps on the accelerator pedal. In an electric vehicle, the accelerator opening degree is a parameter used to control a vehicle acceleration through an accelerator control apparatus (for example, an electric acceleration button). The brake value is a parameter used to control vehicle braking in the intelligent vehicle, and a larger brake value indicates larger braking torque. For example, in a fossil fuel-powered vehicle, the brake value means that a driver steps on a brake pedal with pressure and the pressure is amplified and conducted through a vacuum booster; amplified force pushes a brake master cylinder to pressurize a brake fluid; and the brake fluid is distributed to front and rear wheel brakes through a brake combination valve and a brake warning light is simultaneously on, to control the front and rear wheel brakes, thereby making the vehicle brake. In an electric vehicle, the brake value is a parameter used to control vehicle braking through a brake control apparatus.

A process of obtaining a driving style model in this application is further described below with reference to an example. First, a speed v(t) at a moment t, an accelerator pedal position (pedal position, PP) PP(t), a brake pedal position (brake position, BP) BP(t), and a speed v(t+k) at a moment t+k are extracted from real driving data of the driver. Because a delay may exist in a process of obtaining a speed during traveling of the intelligent vehicle, an actual output of the intelligent vehicle has a delay of k seconds. For example, a value of k is generally 1 to 2 seconds. Herein, v(t), PP(t), and BP(t) are used as inputs of the neural network model, and a speed at the moment t+k obtained after neuron training at each layer in the neural network model is V'(t+k). In this case, a difference between the speed obtained through neural network model training and an actual speed is V(t+k)−V'(t+k). Then, the difference is further modified by using the back propagation principle, to ensure that data obtained by the neural network training model is closer to a real value. Finally, a driving style model trained based on the neural network model is obtained. By continuously training the driving data of the driver, accuracy of the driving style model is improved, and finally the data obtained by the neural network model is closer to the real driving data of the driver.

Optionally, driving style model training is continuous and iterative. Through continuous training, a finally obtained driving style model is closer to the real driving data of the driver. During implementation, a quantity of iterations may be determined based on a preset condition. For example, when the difference between the speed obtained through neural network model training and the actual speed is less than a preset value, the neural network model training is stopped. Alternatively, when a difference between a training result and a real result is within a preset error range, the model training is completed.

It should be noted that the neural network model training may be understood as a black box process, to be specific, a process in which a plurality of groups of driving data are used as a model input and calculation processing is performed on a neuron at each layer in each iteration process to enable a finally obtained model to be closer to an actual operation of the driver. During implementation, quantities of neurons at the input layer, the hidden layer, and the output layer may be set according to a specific requirement. The neural network model is not limited in this application. During implementation, the neural network model may be selected according to a service requirement. In addition, a process of processing a neuron at each layer in the neural network model and a result correction process do not constitute a limitation on this application.

For example, driving data of a driver A and driving data of a driver B are used as sample data in an experience library. Driving data generated when the two drivers drive intelligent vehicles is collected, the driving data is used as an input of the machine learning algorithm, and different driving style models are obtained through machine learning algorithm training and used as preset driving style models. In this case, the experience library includes two different driver style models. If the driver A likes to drive fast, a driver's preference is considered in the driving style model obtained by training the driving data of the driver A, and there are more operations of switching between an accelerator and a brake. If the driver B drives smoothly, emergency braking and frequent acceleration rarely occur in the driving style model obtained by training the driving data of the driver B.

Manner 2: The intelligent vehicle obtains a driving style model through training based on current driving data of the driver.

Alternatively, the driver may select a customized driving style model obtained by training driving data collected based on a driving habit of the driver. For a specific training process, refer to the process of training a preset driving style model in Manner 1. This is not limited in this application.

S204: A decision-making controller determines a target speed and a track control instruction based on current road condition information.

When the intelligent vehicle is in the automated driving mode, the decision-making controller may obtain obstacle information (including but not limited to a type, a height, a speed, and the like of an obstacle) from a fusion system, and obtain position information of the intelligent vehicle from a map system and a positioning device. Then, the decision-making controller in the vehicle control system performs global and/or local path planning, and outputs all or some of traveling tracks through which the intelligent vehicle arrives at the destination. Then, the decision-making controller sends all or some of the traveling tracks through which the intelligent vehicle arrives at the destination to the automated driving controller, and performs an operation of step S205.

Optionally, the decision-making controller may obtain only information provided by at least one of the fusion system, the map system, and the positioning device, perform global and/or local path planning based on the foregoing information, and output all or some of the traveling tracks through which the intelligent vehicle arrives at the destination.

S205: Determine a speed control instruction based on the driving style model selected by the driver and the target speed.

With reference to the driving style model and a conventional target speed adjustment method, the automated driving controller in the vehicle control system controls an input target speed, outputs a longitudinal instruction including accelerator and brake control, and sends a horizontal instruction and the longitudinal instruction to a vehicle execution system, so as to control traveling of the intelligent vehicle. The conventional target speed adjustment method may be a proportional-integral-derivative method, or may be another method. This is not limited in this application.

Figure 4:
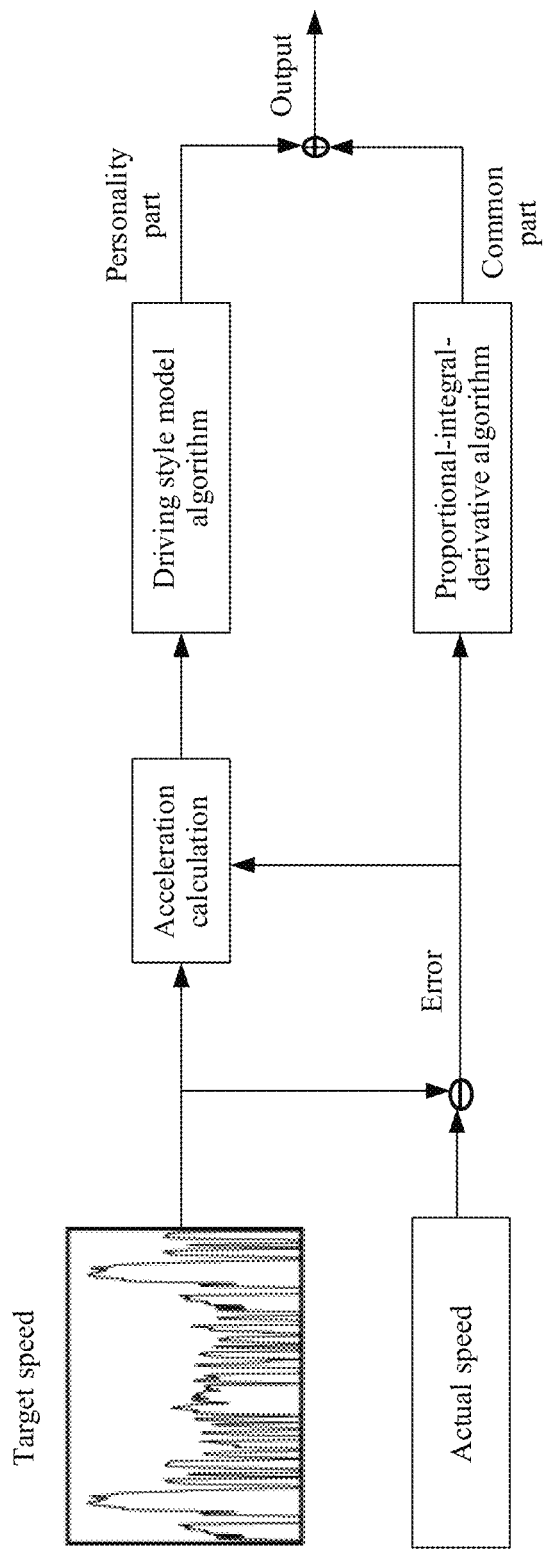
FIG. 4 is a schematic diagram of a human-computer interaction system of an intelligent vehicle according to this application.

FIG. 4 is a schematic diagram of a control process in an automated driving mode according to this application. As shown in the figure, the automated driving controller in the vehicle control system obtains a target speed and an actual speed of the intelligent vehicle from the decision-making controller, calculates an error based on the target speed and the actual speed, uses the error as an input of a proportional-integral-derivative algorithm, calculates, by using an error feedback manner, an accelerator opening degree and a brake value that are required by the intelligent vehicle to reach the target speed, and uses the accelerator opening degree and the brake value as some common requirements for the intelligent vehicle to reach the target speed. The proportional-integral-derivative algorithm includes a proportional unit, an integral unit, and a derivative unit. The error may be adjusted by adjusting gains of the three units, and a larger error indicates a larger adjustment range. For a specific implementation process, refer to a processing process in the conventional technology. Details are not described in this application.

In addition, the automated driving controller calculates, based on the target speed and the error, an acceleration at which the intelligent vehicle reaches the target speed, where the acceleration is used to implement a speed change amount at which a speed of the intelligent vehicle is adjusted to the target speed within a unit time; uses the expected acceleration and the target speed as an input of a driving style model algorithm; obtains an accelerator opening degree and a brake value through calculation by using a machine learning algorithm; and uses the accelerator opening degree and the brake value as a personality part. A type of the machine learning algorithm is not limited in this application. A neural network algorithm including neurons at an input layer, a hidden layer, and an output layer may be used. A quantity of neurons at each layer may be set according to a specific service requirement. For example, during implementation, the quantity of neurons at each layer may be set according to a precision requirement, and a larger quantity of neurons indicates higher precision. Then, the accelerator opening degree and the brake value obtained by using the driving style model algorithm are obtained.

Finally, the accelerator opening degree obtained by using the driving style model algorithm and the accelerator opening degree obtained by using the proportional-integral-derivative algorithm are added, and the brake value obtained by using the driving style model algorithm and the brake value obtained by using the proportional-integral-derivative algorithm are added. A specific addition method may be: By using a weighting method, weights of the accelerator opening degree and the brake value obtained by using the driving style model algorithm and weights of the accelerator opening degree and the brake value obtained by using the proportional-integral-derivative algorithm are set according to a service requirement during implementation. The weight is used to indicate a proportion of the accelerator opening degree or the brake value obtained by using each of the two algorithms. For example, based on hardware capabilities of the intelligent vehicle, weights are respectively configured for the accelerator opening degree obtained by using the proportional-integral-derivative algorithm and the accelerator opening degree obtained by using the driving style model algorithm, a sum of the weights of the foregoing accelerator opening degrees is 1, weights are respectively configured for the brake value obtained by using the proportional-integral-derivative algorithm and the brake value obtained by using the driving style model algorithm, and a sum of the weights of the foregoing brake values is 1. Finally, an accelerator opening degree and a brake value obtained after weight addition based on the accelerator opening degree and the brake value obtained by using the driving style model algorithm and the accelerator opening degree and the brake value obtained by using the conventional algorithm are sent to the vehicle execution system as the speed control instruction. For example, it is assumed that the accelerator opening degree obtained by using the driving style model algorithm is S1, the brake value obtained by using the driving style model algorithm is B1, the accelerator opening degree obtained by using the proportional-integral-derivative algorithm is S2, and the brake value obtained by using the proportional-integral-derivative algorithm is B2. The intelligent driving vehicle is a vehicle with relatively good driving and engine performance. It is assumed that the weight of the accelerator opening degree obtained by using the driving style model algorithm is a1, the weight of the accelerator opening degree obtained by using the proportional-integral-derivative algorithm is a2, the weight of the brake value obtained by using the proportional-integral-derivative algorithm is b1, the weight of the brake value obtained by using the driving style model algorithm is b2, a1+a2=1, and b1+b2=1. In this case, a finally determined accelerator opening degree S is (S1×a1+S2×a2), and a finally determined brake value B is (B1×b1+B2×b2). Therefore, the automated driving controller may send the accelerator opening degree S and the brake value B to the vehicle execution system in the intelligent vehicle as content of the speed control instruction, so as to control traveling of the intelligent vehicle.

In a possible embodiment, in the foregoing weight setting process, a weight may also be set for each algorithm. In this case, the finally determined accelerator opening degree and brake value are obtained through calculation by using the weight allocated to each algorithm. For example, weight setting in the foregoing example is as follows: a1=b1, and a2=b2. In this case, the finally determined accelerator opening degree S is (S1+S2)×a1, and the finally determined brake value B is (B1+B2)×b1.

In a possible embodiment, in a traveling process of the intelligent vehicle, a traveling track and a speed of another vehicle are uncertain, and consequently the traveling track and the speed of the vehicle affect the traveling track and the speed of the intelligent vehicle. Therefore, the foregoing process of determining a speed and a traveling track needs to be adjusted for a plurality of times based on different road conditions. In addition, based on different road conditions in the vehicle traveling process, the accelerator opening degree and the brake value for vehicle traveling also need to be adjusted in real time or periodically. In other words, the process of step S204 and step S205 may need to be repeated when the intelligent vehicle travels in the automated driving mode. In addition, the intelligent vehicle also needs to be designed in consideration of a driving mode switching process. For example, a driving mode of the intelligent vehicle is switched from automated driving to manual driving. In this case, an operation process of S206 needs to be performed.

It should be noted that, in the intelligent vehicle, in addition to the proportional-integral-derivative algorithm, a common part of reaching the target speed may also be determined by using another algorithm. This is not limited in this application.

S206: Determine whether the driver adjusts the driving style model.

S207: When the driver adjusts the driving style model, update the speed control instruction based on a driving style model adjusted by the driver and the target speed.

When the intelligent vehicle includes a plurality of driving style models, the driver is allowed to freely change a driving style model in the traveling process of the intelligent vehicle, so as to obtain different driving experience. When the driver adjusts a driving style, a new track control instruction and speed control instruction are determined with reference to step S204 and step S205.

S208: Send an updated track control instruction and an updated speed control instruction to the vehicle execution system.

In the intelligent vehicle, the vehicle execution system is responsible for managing vehicle control. The vehicle execution system includes a braking system (such as a brake), a steering system (such as a steering wheel), a driving system (such as an engine), and a lighting system (such as a vehicle lamp). The track control instruction and the speed control instruction need to be executed by the vehicle execution system, so as to control traveling of the intelligent vehicle.

S209: Obtain a speed feedback result returned by the vehicle execution system.

In an optional step, after executing the track control instruction and the speed control instruction, the vehicle execution system may return an execution result to the vehicle control system. The execution result includes an instruction execution success or failure.

S210: When the driver does not adjust the driving style model, send the track control instruction and the speed control instruction to the vehicle execution system.

S211: Obtain a speed feedback result returned by the vehicle execution system.

In a possible embodiment, when the driver does not adjust the driving mode, the vehicle control system directly sends the track control instruction and the speed control instruction that are determined in step S205 to the vehicle execution system, and the vehicle execution system controls the intelligent vehicle to travel based on content of the instructions.

S212: Then determine whether the driver adjusts the driving mode.

In the traveling process of the intelligent vehicle, a current driver may adjust the driving mode at any time through steering wheel rotation, braking, or the human-computer interaction interface. When the driver does not adjust the driving mode, step S203 is repeated. When the driver adjusts the driving mode to the manual driving mode, step S213 is performed.

In a possible embodiment, a driving style model is preset in the intelligent vehicle before delivery. However, to match driving habits of different drivers, when the intelligent vehicle enters the manual driving mode, driving data of a current driver may be collected, the driving data is used as an input, a customized driving style model is trained by reusing the machine learning algorithm, and the driving style model of intelligent vehicle is updated. For specific operation steps, refer to step S213 to step S215. The vehicle control system may obtain the customized driving style model based on driving data at a current moment.

S213: When the driving mode is the manual driving mode, obtain driving data of the driver.

When the intelligent vehicle is in the manual driving mode, the driver may be prompted, through an interface, whether to customize a driving style model. As shown in FIG. 3, if the intelligent vehicle is in the manual driving mode, the driver may be prompted, through the manual driving mode selection interface 20 in FIG. 3, whether to customize a driving style model. If the driver taps the customized driving style model 201, driving data of the driver at a current moment is collected, and the driving data is used as an input of the machine learning algorithm subsequently.

Optionally, when the intelligent vehicle is in the manual driving mode, the vehicle control system may further exchange a message with the driver in a voice or another form, to determine whether to customize a driving style model.

It should be noted that FIG. 3 is merely an example provided in this application. After learning of this application, a person skilled in the art may also use another form or interface structure to prompt the driver to select a driving mode, a driving style model, or a customized driving style model.

S214: Train the driving data by using the machine learning algorithm, to obtain a trained driving style model.

S215: Add the customized driving style model to the driving style model library of the intelligent vehicle.

When the intelligent vehicle is in the manual driving mode, first, a manual driving controller of the vehicle control system collects the driving data of the driver; then trains the foregoing driving data based on the driving data by using the method in Manner 1, to obtain a driving style model through training based on the driving data of the current driver; adds the driving style model to the driving style model library of the intelligent vehicle as a customized driving style model; and allows the driver to select the driving style model in the automated driving mode to control traveling of the intelligent vehicle by using the operation processes in step S203 to step S209.

In a possible embodiment, after collecting the driving data of the current driver, the vehicle control system may further send the driving data to a cloud data center in addition to completing training on the driving data in the intelligent vehicle, and the cloud data center generates a customized driving style model based on the driving data and the machine learning algorithm. According to the descriptions of the foregoing process, the driving data is sent to the cloud data center, and the cloud data center may schedule a virtual machine to train the driving data, so as to obtain the customized driving style model. This can avoid a problem that a calculation capability of the vehicle control system in the intelligent vehicle limits a processing speed, and reduce a calculation load of the intelligent vehicle. In addition, the cloud data center may further store the foregoing model, add the foregoing model to a driving style model library stored in the cloud data center, and add the driving style model to another vehicle in addition to the intelligent vehicle in which the driver is located, so that the another vehicle updates a driving style model library and increases a quantity of driving style models for driver's selection. Further, the intelligent vehicle may also send updated driving data of the driver to the cloud data center, and the cloud data center updates a driving style model corresponding to the driver, so that a result that is output by the driving style model is closer to an actual driving process of the driver. Optionally, the driving data of the driver is stored in the cloud data center, and when the driver selects the customized model through the human-computer interaction interface, the traveling process of the intelligent vehicle may also be remotely controlled by the cloud data center. In other words, an identifier of a driving style model selected by the driver is sent to the cloud data center, and the cloud data center controls the traveling process of the intelligent vehicle based on an accelerator opening degree and a brake value that are defined in the driving style model.

According to the intelligent vehicle control method provided in this application, two modes are set for the intelligent vehicle: the manual driving mode and the automated driving mode. In the manual driving mode, the vehicle control system may collect the driving data of the current driver in real time, train the customized driving style model of the driver by using the machine learning algorithm, update the driving style model library of the intelligent vehicle, and allow the driver to select the customized driving style model in the automated driving mode to control traveling of the intelligent vehicle. This improves driving experience of the driver. In the automated driving mode, the driving style model selected by the driver is combined with the conventional proportional-integral-derivative method. When a current speed is adjusted, the driving habit of the driver is further considered in the driving process based on the driving style model selected by the driver, so as to implement anthropomorphic control on the intelligent vehicle. The automated driving process of intelligent vehicle is closer to the driving habit of the driver. This improves driving experience. Moreover, in addition to presetting a classic driving style model library during manufacture of the intelligent vehicle, a customized driving style model may also be retrained based on driving data of a current driver of the intelligent vehicle, and the customized driving style model is added to the driving style model library of the intelligent vehicle. In the automated driving mode, the driver is allowed to select the customized driving style model, so that the intelligent vehicle travels based on a parameter in the driving style model selected by the driver. This further improves driving experience of the driver.

It should be noted that, for brief description, the method embodiments are described as a combination of a series of actions. However, a person skilled in the art should know that this application is not limited to the described sequence of the actions.

The intelligent vehicle control method provided in this application is described above in detail with reference to FIG. 1 to FIG. 4. An intelligent vehicle control apparatus, a control system, and an intelligent vehicle provided in this application are further described below with reference to FIG. 5 and FIG. 6.

Figure 5:
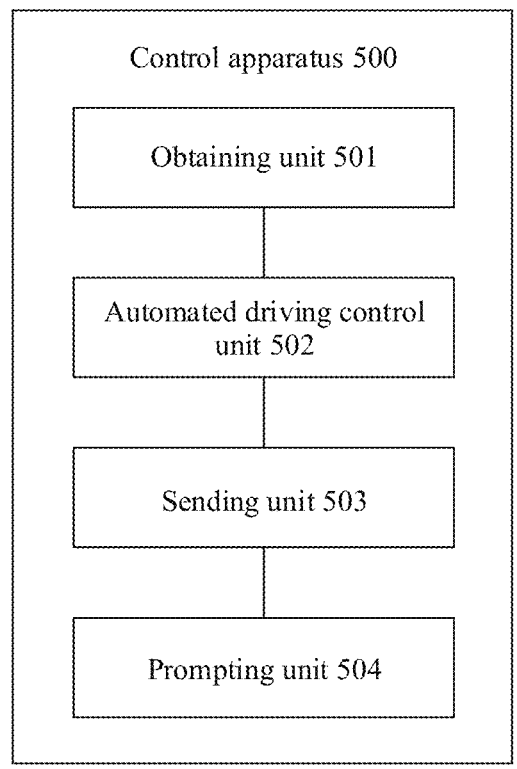
FIG. 5 is a schematic diagram of a structure of an intelligent vehicle control apparatus according to this application.

FIG. 5 is a schematic diagram of a structure of a control apparatus 500 according to this application. As shown in the figure, the control apparatus 500 includes an obtaining unit 501, an automated driving control unit 502, and a sending unit 503.

The obtaining unit 501 is configured to obtain a driving mode, a driving style model, and a target speed of an intelligent vehicle at a current moment.

The automated driving control unit 502 is configured to determine a speed control instruction based on the driving mode and the driving style model.

The sending unit 503 is configured to send the speed control instruction to a vehicle execution system of the intelligent vehicle.

It should be understood that the apparatus 500 in this embodiment of this application may be implemented by using an application-specific integrated circuit (application-specific integrated circuit, ASIC) or a programmable logic device (programmable logic device, PLD). The PLD may be a complex programmable logic device (complex programmable logic device, CPLD), a field programmable gate array (field-programmable gate array, FPGA), generic array logic (generic array logic, GAL), or any combination thereof. Alternatively, when the intelligent vehicle control method shown in FIG. 2A and FIG. 2B may be implemented by using software, the apparatus 500 and the modules of the apparatus may be software modules.

Optionally, the speed control instruction includes an accelerator opening degree and a brake value, the accelerator opening degree is a parameter used to control a vehicle acceleration in the intelligent vehicle, and the brake value is a parameter used to control vehicle braking in the intelligent vehicle.

Optionally, the automated driving control unit 502 is further configured to determine a traveling track and the target speed based on road condition information at the current moment, where the road condition information includes information provided by a map system, a positioning device, and a fusion system of the intelligent vehicle; and the obtaining unit 501 is further configured to obtain a driving mode and a driving style model that are selected by a driver.

Optionally, the driving mode is an automated driving mode, the intelligent vehicle includes a driving style model library, the driving style model library includes a set of a plurality of driving style models, and each driving style model includes different accelerator opening degrees and brake values.

Optionally, the obtaining unit 501 is further configured to: when the driving mode is a manual driving mode, collect driving data of the driver of the intelligent vehicle within a preset time period; and the automated driving control unit 502 is further configured to: obtain a customized driving style model based on the driving data by using a machine learning method, where the customized driving style model includes an accelerator opening degree and a brake value that match a driving habit of the driver; and add the customized driving style model to the driving style model library.

Optionally, the automated driving control unit 502 is further configured to: calculate an error between an actual speed and the target speed of the intelligent vehicle at the current moment; determine an acceleration based on the error, where the acceleration is used to indicate a speed change amount of the intelligent vehicle from the actual speed at the current moment to the target speed within a unit time; determine a first accelerator opening degree and a first brake value according to a proportional-integral-derivative algorithm; determine a second accelerator opening degree and a second brake value based on the driving style model selected by the driver; obtain a third accelerator opening degree through calculation based on the first accelerator opening degree, a first weight, the second accelerator opening degree, and a second weight, where a sum of the first weight and the second weight is 1; and obtain a third brake value through calculation based on the first brake value, a third weight, the second brake value, and a fourth weight, where a sum of the third weight and the fourth weight is 1.

The sending unit 503 is further configured to send the speed control instruction including the third accelerator opening degree and the third brake value to the vehicle execution system.

Optionally, the apparatus further includes a prompting unit 504, configured to provide the driving style model library of the intelligent vehicle for the driver through a human-computer interaction controller. The driver can select a driving style model from the driving style model library in a form of a voice, a text, or a button.

The obtaining unit 501 is further configured to receive the driving style model that is selected by the driver and that is sent by the human-computer interaction controller.

The control apparatus 500 in this embodiment of this application may correspondingly perform the method described in the embodiments of this application. In addition, the foregoing and other operations and/or functions of the units in the control apparatus 500 are used to implement corresponding procedures of the method in FIG. 2A and FIG. 2B. For brevity, details are not described herein again.

Figure 6:
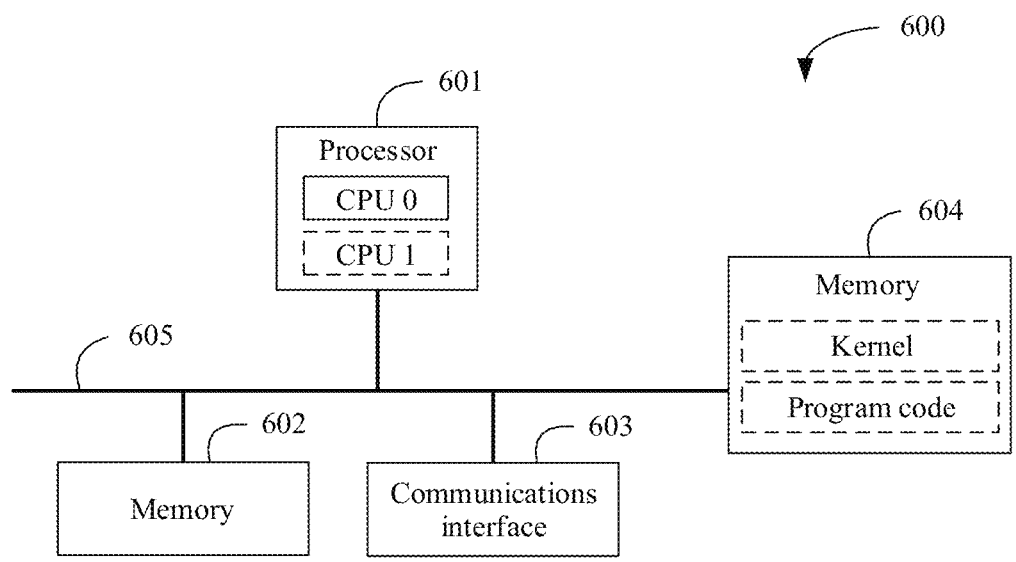
FIG. 6 is a schematic diagram of a structure of an intelligent vehicle control system according to this application.

FIG. 6 is a schematic diagram of a control system 600 according to this application. As shown in the figure, the control system 600 includes a processor 601, a memory 602, a communications interface 603, a memory 604, and a bus 605. The processor 601, the memory 602, the communications interface 603, and the memory 604 communicate with each other through the bus 605, or may communicate with each other in another manner, for example, through wireless transmission. The memory 602 is configured to store instructions. The processor 601 is configured to execute the instructions stored in the memory 602. The memory 602 stores program code, and the processor 601 may invoke the program code stored in the memory 602 to perform the following operations:

obtaining a driving mode, a driving style model, and a target speed of an intelligent vehicle at a current moment;

determining a speed control instruction based on the driving mode and the driving style model; and sending the speed control instruction to a vehicle execution system of the intelligent vehicle.

It should be understood that, in this embodiment of this application, the processor 601 may be a CPU, or the processor 601 may be another general-purpose processor, a digital signal processor (digital signal processor, DSP), an application-specific integrated circuit (ASIC), a field programmable gate array (FPGA) or another programmable logic device, a discrete gate or transistor logic device, a discrete hardware component, or the like. The general-purpose processor may be a microprocessor, any conventional processor, or the like.

The memory 602 may include a read-only memory and a random access memory, and provide the processor 601 with instructions and data. The memory 602 may further include a nonvolatile random access memory. For example, the memory 602 may further store information about a device type.

The memory 602 may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), and is used as an external cache. By way of example and not limitation, many forms of RAMs may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

The communications interface 603 includes a network interface/module configured to communicate with another device or system.

The memory 604 may be physically integrated with the processor 601, or may be disposed in the processor 601, or may exist in a form of an independent unit. A computer program may be stored in the memory 604 or the memory 602. Optionally, computer program code (for example, a kernel or a to-be-debug program) stored in the memory 602 is copied to the memory 604, and is further executed by the processor 601.

The bus 605 may further include a power bus, a control bus, a status signal bus, and the like in addition to a data bus. However, for clear description, various types of buses are marked as the bus 605 in the figure. Optionally, the bus 605 may be a peripheral component interconnect express (Peripheral Component Interconnect Express, PCIe), a controller area network (controller area network, CAN), an automotive Ethernet (Ethernet), or another internal bus for implementing connection between the components/devices shown in FIG. 6.

It should be understood that the intelligent vehicle control system 600 in this embodiment of this application may correspond to the control apparatus 500 in this embodiment of this application, and may correspond to a body that correspondingly performs the method shown in FIG. 2A and FIG. 2B in this embodiment of this application. In addition, the foregoing and other operations and/or functions of the modules in the control system 600 are used to implement corresponding procedures of the method in FIG. 2A and FIG. 2B. For brevity, details are not described herein again.

This application further provides an intelligent vehicle control system. The control system includes the manual driving controller 301, the decision-making controller 302, and the automated driving controller 303 shown in FIG. 1. The components in the control system are configured to perform the operation steps performed by the corresponding execution bodies in the method shown in FIG. 2A and FIG. 2B. For brevity, details are not described herein again.

This application further provides an intelligent vehicle. The intelligent vehicle includes the human-computer interaction controller, the driving mode selector, the vehicle control system, and the vehicle execution system shown in FIG. 1. The components in the intelligent vehicle are configured to perform the operation steps performed by the corresponding execution bodies in the method shown in FIG. 2A and FIG. 2B. For brevity, details are not described herein again.

This application further provides a control system. The system further includes a cloud data center in addition to the intelligent vehicle shown in FIG. 1. The intelligent vehicle includes the human-computer interaction controller, the driving mode selector, the vehicle control system, and the vehicle execution system shown in FIG. 1. The components in the intelligent vehicle are configured to perform the operation steps performed by the corresponding execution bodies in the method shown in FIG. 2A and FIG. 2B. For brevity, details are not described herein again. In addition, the cloud data center is configured to receive driving data sent by the vehicle control system, and schedule a virtual machine in the cloud data center to train the driving data, so as to obtain a customized driving style model. This can avoid a problem that a calculation capability of the vehicle control system in the intelligent vehicle limits a processing speed, and reduce a calculation load of the intelligent vehicle. In addition, the cloud data center may further store the foregoing model, add the foregoing model to a driving style model library stored in the cloud data center, and add the driving style model to another vehicle in addition to the intelligent vehicle in which a driver is located, so that the another vehicle updates a driving style model library and increases a quantity of driving style models for driver's selection. Further, the intelligent vehicle may also send updated driving data of the driver to the cloud data center, and the cloud data center updates a driving style model corresponding to the driver, so that a result that is output by the driving style model is closer to an actual driving process of the driver. Moreover, the intelligent vehicle may also send an identifier of a driving style model selected by the driver to the cloud data center, and the cloud data center controls a traveling process of the intelligent vehicle based on an accelerator opening degree and a brake value that are defined in the driving style model.

All or some of the foregoing embodiments may be implemented by using software, hardware, firmware, or any other combination thereof. When the software is used to implement the embodiments, all or some of the foregoing embodiments may be implemented in a form of a computer program product. The computer program product includes one or more computer instructions. When the computer program instructions are loaded or executed on a computer, the procedure or functions according to the embodiments of this application are entirely or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive (solid-state drive, SSD).

The foregoing descriptions are merely specific implementations of this application. Any variation or replacement readily figured out by a person skilled in the art based on the specific implementations provided in this application shall fall within the protection scope of this application.

What is claimed is:

1. An intelligent vehicle control method, wherein the intelligent vehicle control method comprises:

obtaining, by a vehicle control system, a driving mode, a driving style model, and a target speed of an intelligent vehicle at a current moment;

determining, by the vehicle control system, a speed control instruction based on the driving mode, the driving style model, and the target speed, wherein the target speed is obtained based on road condition information at the current moment, wherein the road condition information comprises one or more pieces of information provided by a map system, a positioning device, or a fusion system of the intelligent vehicle; and sending, by the vehicle control system, the speed control instruction to a vehicle execution system of the intelligent vehicle.

2. The intelligent vehicle control method according to claim 1, wherein the speed control instruction comprises an accelerator opening degree and a brake value, the accelerator opening degree is a parameter used to control a vehicle acceleration in the intelligent vehicle, and the brake value is a parameter used to control vehicle braking in the intelligent vehicle.

3. The intelligent vehicle control method according to claim 1, wherein the vehicle control system comprises a decision-making controller and an automated driving controller, and the intelligent vehicle control method further comprises:

determining, by the decision-making controller, a traveling track and the target speed based on road condition information at the current moment; and obtaining, by the automated driving controller, the driving mode and the driving style model that are selected by a driver.

4. The intelligent vehicle control method according to claim 1, wherein the determining, by the vehicle control system, a speed control instruction based on the driving mode, the driving style model and the target speed comprises:

calculating, by an automated driving controller, an error between an actual speed and the target speed of the intelligent vehicle at the current moment;

determining, by the automated driving controller, an acceleration based on the error, wherein the acceleration is used to indicate a speed change amount of the intelligent vehicle from the actual speed at the current moment to the target speed within a unit time;

determining, by the automated driving controller, a first accelerator opening degree and a first brake value;

determining, by the automated driving controller, a second accelerator opening degree and a second brake value based on the driving style model selected by a driver;

obtaining, by the automated driving controller, a third accelerator opening degree through calculation based on the first accelerator opening degree, a first weight, the second accelerator opening degree, and a second weight; and obtaining a third brake value through calculation based on the first brake value, a third weight, the second brake value, and a fourth weight, wherein the first weight and the second weight are accelerator opening degree weights, a sum of the first weight and the second weight is 1, the third weight and the fourth weight are brake value weights, and a sum of the third weight and the fourth weight is 1; and wherein the sending, by the vehicle control system, the speed control instruction to a vehicle execution system of the intelligent vehicle comprises:

sending, by the automated driving controller, the speed control instruction to the vehicle execution system, wherein the speed control instruction comprises the third accelerator opening degree and the third brake value.

5. The intelligent vehicle control method according to claim 1, wherein the driving mode is an automated driving mode, the intelligent vehicle comprises a driving style model library, the driving style model library comprises a plurality of preset driving style models, and each of the plurality of preset driving style models comprises a different accelerator opening degree and a different brake value.

6. The intelligent vehicle control method according to claim 5, wherein the intelligent vehicle control method further comprises:

providing, by the vehicle control system, the driving style model library of the intelligent vehicle for a driver through a human-computer interaction controller, wherein the driver is capable of selecting the driving style model from the driving style model library in a form of a voice, a text, or a button; and receiving, by the vehicle control system, the driving style model that is selected by the driver and that is sent by the human-computer interaction controller.

7. The intelligent vehicle control method according to claim 1, wherein before the obtaining, by a vehicle control system, a driving mode, a driving style model, and a target speed of an intelligent vehicle at a current moment, the intelligent vehicle control method further comprises:

when the driving mode of the intelligent vehicle is a manual driving mode, collecting, by the vehicle control system, driving data of a driver of the intelligent vehicle within a preset time period;

obtaining, by the vehicle control system, a customized driving style model based on the driving data by using a machine learning algorithm, wherein the customized driving style model comprises an accelerator opening degree and a brake value that match a driving habit of the driver; and adding, by the vehicle control system, the customized driving style model to a driving style model library of the intelligent vehicle.

8. The intelligent vehicle control method according to claim 1, wherein the determining a speed control instruction comprises:

obtaining an actual speed of the intelligent vehicle;

obtaining an acceleration based on the target speed and an error between the target speed and the actual speed; and obtaining an accelerator opening degree and a brake value through calculation by using a machine learning algorithm of the driving style model selected by a driver, wherein the acceleration and the target speed are used as an input to the machine learning algorithm.

9. An intelligent vehicle control apparatus, wherein the intelligent vehicle control apparatus comprises:

at least one processor; and one or more memories coupled to the at least one processor and storing program instructions for execution by the at least one processor to:

obtain a driving mode, a driving style model, and a target speed of an intelligent vehicle at a current moment;

determine a speed control instruction based on the driving mode, the driving style model, and the target speed, wherein the target speed is obtained based on road condition information at the current moment, wherein the road condition information comprises one or more pieces of information provided by a map system, a positioning device, or a fusion system of the intelligent vehicle; and send the speed control instruction to a vehicle execution system of the intelligent vehicle.

10. The intelligent vehicle control apparatus according to claim 9, wherein the speed control instruction comprises an accelerator opening degree and a brake value, the accelerator opening degree is a parameter used to control a vehicle acceleration in the intelligent vehicle, and the brake value is a parameter used to control vehicle braking in the intelligent vehicle.

11. The intelligent vehicle control apparatus according to claim 9, wherein the one or more memories store the program instructions for execution by the at least one processor to:

determine a traveling track and the target speed based on road condition information at the current moment, wherein the road condition information comprises one or more pieces of information provided by a map system, a positioning device, and a fusion system of the intelligent vehicle; and obtain the driving mode and a driving style model that are selected by a driver.

12. The intelligent vehicle control apparatus according to claim 9, wherein the one or more memories store the program instructions for execution by the at least one processor to:

calculate an error between an actual speed and the target speed of the intelligent vehicle at the current moment;

determine an acceleration based on the error, wherein the acceleration is used to indicate a speed change amount of the intelligent vehicle from the actual speed at the current moment to the target speed within a unit time;

determine a first accelerator opening degree and a first brake value;

determine a second accelerator opening degree and a second brake value based on the driving style model selected by a driver;

obtain a third accelerator opening degree through calculation based on the first accelerator opening degree, a first weight, the second accelerator opening degree, and a second weight, wherein a sum of the first weight and the second weight is 1;

obtain a third brake value through calculation based on the first brake value, a third weight, the second brake value, and a fourth weight, wherein a sum of the third weight and the fourth weight is 1; and send the speed control instruction comprising the third accelerator opening degree and the third brake value to the vehicle execution system.

13. The intelligent vehicle control apparatus according to claim 9, wherein the driving mode is an automated driving mode, the intelligent vehicle comprises a driving style model library, the driving style model library comprises a plurality of driving style models, and each of the plurality of driving style models comprises a different accelerator opening degree and a different brake value.

14. The intelligent vehicle control apparatus according to claim 13, wherein the one or more memories store the program instructions for execution by the at least one processor to:

provide the driving style model library of the intelligent vehicle for a driver through a human-computer interaction controller, wherein the driver can select the driving style model from the driving style model library in a form of a voice, a text, or a button; and receive the driving style model that is selected by the driver and that is sent by the human-computer interaction controller.

15. The intelligent vehicle control apparatus according to claim 9, wherein the one or more memories store the program instructions for execution by the at least one processor to:

when the driving mode is a manual driving mode, collect driving data of a driver of the intelligent vehicle within a preset time period; and obtain a customized driving style model based on the driving data by using a machine learning method, wherein the customized driving style model comprises an accelerator opening degree and a brake value that match a driving habit of the driver; and add the customized driving style model to a driving style model library.

16. The intelligent vehicle control apparatus according to claim 9, wherein the one or more memories store the program instructions for execution by the at least one processor to:

obtain an actual speed of the intelligent vehicle;

obtain an acceleration based on the target speed and an error between the target speed and the actual speed; and obtain an accelerator opening degree and a brake value through calculation by using a machine learning algorithm of the driving style model selected by a driver, wherein the acceleration and the target speed are used as an input to the machine learning algorithm.

17. A non-transitory computer-readable storage medium, wherein the non-transitory computer-readable storage medium stores program instructions for execution by at least one processor to:

obtain a driving mode, a driving style model, and a target speed of an intelligent vehicle at a current moment;

determine a speed control instruction based on the driving mode, the driving style model, and the target speed, wherein the target speed is obtained based on road condition information at the current moment, wherein the road condition information comprises one or more pieces of information provided by a map system, a positioning device, or a fusion system of the intelligent vehicle; and send the speed control instruction to a vehicle execution system of the intelligent vehicle.

18. The non-transitory computer-readable storage medium according to claim 17, wherein the speed control instruction comprises an accelerator opening degree and a brake value, the accelerator opening degree is a parameter used to control a vehicle acceleration in the intelligent vehicle, and the brake value is a parameter used to control vehicle braking in the intelligent vehicle.

19. The non-transitory computer-readable storage medium according to claim 17, wherein the non-transitory computer-readable storage medium stores the program instructions for execution by the at least one processor to:

determine a traveling track and the target speed based on road condition information at the current moment, wherein the road condition information comprises one or more pieces of information provided by a map system, a positioning device, and a fusion system of the intelligent vehicle; and obtain the driving mode and a driving style model that are selected by a driver.

20. The non-transitory computer-readable storage medium according to claim 17, wherein the driving mode is an automated driving mode, the intelligent vehicle comprises a driving style model library, the driving style model library comprises a plurality of driving style models, and each of the plurality of driving style models comprises a different accelerator opening degree and a different brake value.

* * * * *